(12) United States Patent
Choi et al.

(10) Patent No.: US 8,531,580 B2
(45) Date of Patent: Sep. 10, 2013

(54) IMAGING DEVICE INCLUDING A PLURALITY OF IMAGING UNITS

(75) Inventors: Min-Seog Choi, Seoul (KR); Woon-Bae Kim, Seoul (KR); Eun-Sung Lee, Hwaseong-si (KR); Kyu-Dong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 13/032,137

(22) Filed: Feb. 22, 2011

(65) Prior Publication Data

US 2012/0002096 A1    Jan. 5, 2012

(30) Foreign Application Priority Data

Jul. 5, 2010  (KR) .................. 10-2010-0064520

(51) Int. Cl.
*H04N 5/225* (2006.01)
*H04N 7/00* (2011.01)

(52) U.S. Cl.
USPC ............................... 348/340; 348/36

(58) Field of Classification Search
USPC ............ 348/335, 36, 340, 376, 375, 39, 373, 348/159, 153; 359/626
See application file for complete search history.

(56) References Cited

U.S. PATENT DOCUMENTS

| | | | |
|---|---|---|---|
| 6,765,617 B1 * | 7/2004 | Tangen et al. ................. | 348/340 |
| 7,256,895 B2 * | 8/2007 | Castonguay .................. | 356/511 |
| 7,408,703 B2 | 8/2008 | Matsuki et al. | |
| 7,893,985 B1 * | 2/2011 | Ahiska et al. ................. | 348/335 |
| 2003/0071896 A1 * | 4/2003 | Hunter ............................. | 348/88 |
| 2006/0044450 A1 | 3/2006 | Wolterink et al. | |
| 2006/0044451 A1 * | 3/2006 | Liang et al. .................... | 348/340 |
| 2007/0188653 A1 * | 8/2007 | Pollock et al. ................. | 348/373 |
| 2009/0066797 A1 | 3/2009 | Miyachi et al. | |
| 2009/0130791 A1 | 5/2009 | Kwon et al. | |
| 2009/0225432 A1 * | 9/2009 | Toyoda et al. ................. | 359/626 |
| 2010/0007714 A1 * | 1/2010 | Kim et al. ....................... | 348/36 |
| 2013/0050401 A1 * | 2/2013 | Tannhaeuser et al. .......... | 348/36 |

FOREIGN PATENT DOCUMENTS

| | | |
|---|---|---|
| JP | 2008-197540 A | 8/2008 |
| JP | 2009-55554 A | 3/2009 |
| JP | 2009-211012 A | 9/2009 |
| KR | 10-2005-0044453 A | 5/2005 |
| KR | 10-2006-0122767 A | 11/2006 |
| KR | 10-0652571 B1 | 12/2006 |
| KR | 10-2007-0089889 A | 9/2007 |
| KR | 10-0832895 B1 | 5/2008 |

(Continued)

*Primary Examiner* — Tuan Ho
*Assistant Examiner* — Shahbaz Nazrul
(74) *Attorney, Agent, or Firm* — Sughrue Mion, PLLC

(57) ABSTRACT

An imaging device with a plurality of imaging units is provided. The imaging device includes a supporting substrate, a flexible substrate and a movable unit. The supporting substrate is formed with a hard material, and the flexible substrate includes a plurality of imaging units positioned at least in a width direction. The flexible substrate is fixed at a first edge portion with the supporting substrate, while an opposite second edge portion of the flexible substrate is connected with the movable unit. The movable unit moves the opposite second edge portion of the flexible substrate in the width direction and bends or flattens the flexible substrate. A degree of curvature at which the flexible substrate is bent may vary based on a distance by which the movable unit moves in the width direction, so that a field of view (FOV) of the plurality of imaging units may be adjusted.

26 Claims, 18 Drawing Sheets

(56) References Cited

FOREIGN PATENT DOCUMENTS

| KR | 10-0876107 | B1 | 12/2008 |
| KR | 10-2009-0052019 | A | 5/2009 |
| KR | 10-0903553 | B1 | 6/2009 |
| KR | 10-2010-0006867 | A | 1/2010 |
| WO | 2008/143461 | A2 | 11/2008 |

* cited by examiner

IMAGING DEVICE INCLUDING A PLURALITY OF IMAGING UNITS

CROSS-REFERENCE TO RELATED APPLICATION

This application claims priority from Korean Patent Application No. 10-2010-0064520, filed in the Korean Intellectual Property Office on Jul. 5, 2010, the entire disclosure of which is incorporated herein by reference for all purposes.

BACKGROUND

1. Field

Apparatuses and methods consistent with embodiments relate generally to an imaging device, and more particularly, to an imaging device including a plurality of imaging units.

2. Description of the Related Art

Imaging devices for forming still images or moving images have been applied in various fields. Recently, imaging devices became essential components of portable electronics, such as a mobile phone and a Personal Digital Assistant (PDA), and their applications are now extending to medical cameras, security/monitoring cameras, on-vehicle cameras, cameras for robots, etc. With this trend, required functions or performances of imaging devices are also differentiated according to applications.

For example, a portable digital camera, a camcorder, a camera for mobile phone, etc. have primarily requirements for miniaturization, minimal thickness, light weight and high-resolution, but generally do not require a wide Field of View (FOV). These cameras generally have a maximum FOV of 60 to 65 degrees; and in the case of a wide-angle lens, a maximum FOV of 80 degrees. Accordingly, these cameras are not generally capable of photographing at a wide FOV reaching 120 degrees or more. Meanwhile, security/monitoring cameras, on-vehicle cameras for side view, cameras for robots, medical cameras, etc. may need a wide FOV reaching 120 degrees or more in order to minimize blind spots.

For this reason, various methods have been proposed to implement a wide FOV in an imaging device. One method is to use a special lens, such as a wide-angle lens or a fisheye lens, as a lens for an imaging device. However, in this case, the special lenses may cause distortion in acquired images, and the thickness of such a special lens also increases the entire thickness of the imaging device. Korea Laid-open Patent Application No. 2005-0044453, entitled "A Wide-Angle Imaging Optical System and Wide-Angle Imaging Device, Monitoring Imaging Device, On-Vehicle Imaging Device and Projection Device with Wide-Angle Imaging Optical System," discloses an imaging device capable of forming panoramic images over a super-wide range by using a combination of reflective planes and a combination of lenses. Also, Korean Laid-open Patent application No. 2010-0006867, entitled "Flexible Image Photographing Apparatus with a Plurality of Image Forming Units and Method for Manufacturing the Same," discloses an imaging device that can be bent forward and backward by arranging a plurality of image forming units in the form of an array and manufacturing all members including the main body with a flexible substance.

SUMMARY OF THE INVENTION

One or more exemplary embodiments provide an imaging device including a plurality of imaging units in a thin, compact structure that can achieve a wide, adjustable Field of View (FOV) without image distortion.

One or more exemplary embodiments also provide an imaging device including a plurality of imaging units capable of acquiring normal images and panoramic images by obtaining a wide FOV of 180 degrees or more with a small number of imaging units.

According to an aspect of an exemplary embodiment, there is provided an imaging device including a supporting substrate unit, a flexible substrate unit and a movable unit. The supporting substrate unit includes a supporting substrate formed with a hard material, and the flexible substrate unit includes a flexible substrate in which a plurality of imaging units are arranged at least in a width direction. The flexible substrate is fixed with the supporting substrate at a first edge portion of the flexible substrate, and an opposite second edge portion of the flexible substrate is coupled with the movable unit. The movable unit moves the opposite second edge portion of the plurality of imaging units in the width direction to bend the flexible substrate or flatten an already bent flexible substrate. A degree of curvature at which the flexible substrate is bent may vary based on a distance by which the movable unit moves in the width direction, so that a field of view (FOV) of the plurality of imaging units may be adjusted.

In another exemplary embodiment, an imaging device includes a flexible substrate, a plurality of imaging units and a movable unit configured to move the flexible substrate between a flat position and a curved position.

The above and/or other aspects will be more apparent from the following detailed description of exemplary embodiments taken in conjunction with the accompanying drawings and the claims.

BRIEF DESCRIPTION OF THE DRAWINGS

FIGS. 8A, 8B, 9A and 9B are front and side views illustrating an exemplary embodiment of a pantoscopic camera, wherein FIGS. 8A and 8B show a state when photographing is performed with a single imaging unit, and wherein FIGS. 9A and 9B show a state when photographing is performed with a plurality of imaging units.

FIGS. 10A, 10B, 11A and 11B are front and side views illustrating another exemplary embodiment of a pantoscopic camera, wherein FIGS. 10A and 10B show a state when photographing is performed with a single imaging unit, wherein and FIGS. 11A and 11B show a state when photographing is performed with a plurality of imaging units.

Figure 1A:
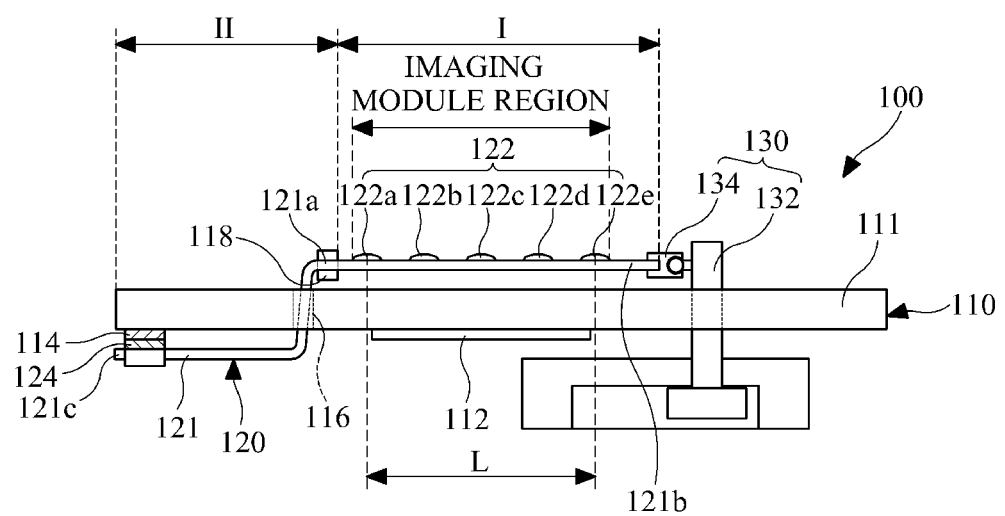
FIG. 1A is a sectional view illustrating an example of an imaging device, according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1B:
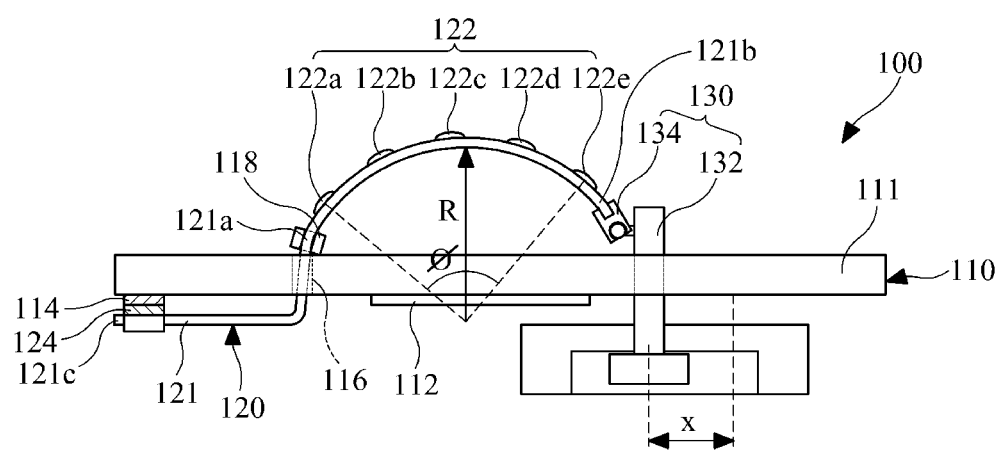
FIG. 1B is a sectional view illustrating a state where a flexible substrate of the imaging device illustrated in FIG. 1A is bent at a predetermined curvature, according to an exemplary embodiment.

FIGS. 1A and 1B are sectional views illustrating an exemplary embodiment of an imaging device 100 with a plurality of imaging units, wherein FIG. 1A shows a state where a flexible substrate 121 of the imaging device 100 is flattened, and FIG. 1B shows a state where the flexible substrate unit 121 is bent at a predetermined curvature. Referring to FIGS. 1A and 1B, the imaging device 100 includes a supporting substrate unit 110, a flexible substrate 120 and a movable unit 130.

The supporting substrate unit 110 includes a supporting substrate 111 made of a hard material, and the flexible substrate unit 120 includes a flexible substrate 121 made of a flexible material. The supporting substrate 111 may be formed with a material such as epoxy resin generally used for a hard Printed Circuit Board (PCB), or with a material such as ceramic, plastic, glass or the like. Meanwhile, the flexible substrate 121 may be formed with a flexible material such as polyester, polyimide or the like.

The supporting substrate 111 acts to structurally support the imaging device 100. The supporting substrate 111 affixes a part of the flexible substrate 121; that is, a fixing portion 121a of the flexible substrate 121 is affixed with the supporting substrate 111 to prevent the flexible substrate 121 from moving in a width direction. Here, the fixing portion 121a is a part of the flexible substrate 121 that is fixed with the supporting substrate 111.

Figure 1C:
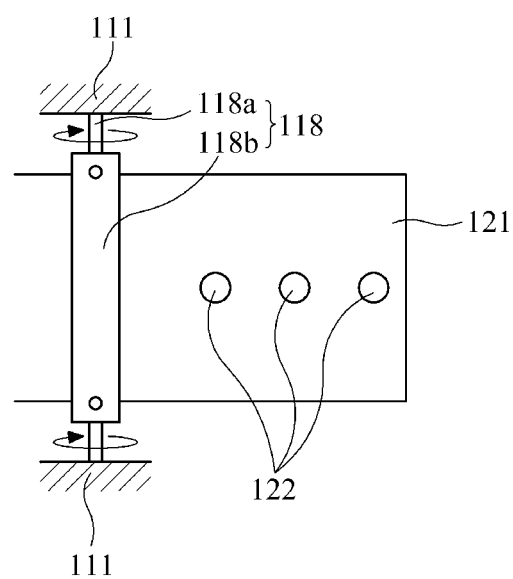
FIG. 1C is a plan view illustrating a part of the imaging device illustrated in FIG. 1A, according to an exemplary embodiment.

The fixing portion 121a of the flexible substrate 121 may be directly fixed with the supporting substrate 111 or indirectly fixed with the supporting substrate 111 using another component fixed with the supporting substrate 111 as a medium. For example, as illustrated in FIG. 1C, the fixing portion 121a of the flexible substrate 121 may be indirectly fixed with the supporting substrate 111 using a connecting member 118 fixed with the supporting substrate 111 as a medium. The connecting member 118 may include a fixing member 118a fixed with the supporting substrate 111 and a pair of fixing plates 118b that are coupled with the fixing member 118a in such a manner to have mobility at least in a up-down direction with respect to the fixing member 118. However, this structure is only exemplary (FIG. 1C shows a structure where the fixing plate 118b is coupled with the fixing member 118a in such a manner to be movable in a up-down direction with respect to the fixing member 118a).

The fixing portion 121a of the flexible substrate 121 may correspond to an edge portion of the flexible substrate 121; however, this is only exemplary. Since the flexible substrate 121 is fixed with the supporting substrate 111 at an edge portion, when a width direction force is applied to move the opposite edge portion 121b of the fixing portion 121a toward the fixing portion 121a, the flexible substrate 121 gets bent at a predetermined curvature (see FIG. 1B). If necessary, an extra device for bending the flexible substrate 121 in the outer direction (that is, in the direction away from the supporting substrate 111) may be provided.

The flexible substrate unit 120 includes a plurality of imaging units 122 that are installed in the flexible substrate 121. That is, the flexible substrate 121 may be a FPCB (Flexible Printed Circuit Board) in which a plurality of imaging units 122 are installed. The plurality of imaging units 122 may be aligned in a horizontal or width direction between the fixing portion 121a and the opposite edge portion 121b (hereinafter, referred to as an "image unit region"). For example, the imaging units 122 may be aligned in a width direction or 2-dimensionally arranged in the form of an array. Alternatively, a portion of the imaging units 122 may be aligned in a width direction, and the remaining portion of the imaging units 122 may be arranged at a different location (see FIGS. 10A and 11A).

Each of the imaging units 122 receives incident light from outside of the device and converts the received light into electrical signals, thus generating image signals (in FIGS. 1A and 1B, each imaging unit 122 is illustrated to have a lens shape, but each imaging unit 122 may have any other shape). The imaging units 122 may be arranged at least in a width direction on the imaging unit region. In this case, by applying a width direction force to the flexible substrate 121 to protrude the imaging unit region upward, a Field of View (FOV) of the imaging device 100 may be increased. Then, by adjusting a curvature at which the imaging unit region is bent, that is, a distance by which the movable unit 130 moves, the FOV of the imaging device 100 may be adjusted.

In more detail, as illustrated in FIGS. 1A and 1B, it is assumed that when a movable column 132 moves by a distance X toward the fixing portion 121a, the imaging unit region is bent with the radius of curvature R in a circular form. In this case, when a bending angle between imaging units 122a and 122e positioned at both ends of the imaging units 122 and spaced apart by a distance L, that is, the angle of circumference whose circular arc is the imaging unit region is Φ, Equations 1 and 2 are satisfied below.

$$L = \Phi \cdot R \qquad (1)$$

$$\sin\left(\frac{\Phi}{2}\right) = \frac{L - X}{2R} \qquad (2)$$

By using Equations 1 and 2, the relationship between the radius of curvature R and the angle of circumference Φ of the flexible substrate 121 with respect to the movement distance X of the movable column 132 may be calculated. That is, the relationship between the radius of curvature R and the angle of circumference Φ of the flexible substrate 121 with respect to the movement distance X of the opposite edge portion 121b may be calculated. The FOV of the imaging device 100 may be calculated using the angle of circumference Φ of the imaging unit region and the FOV of each of the imaging units 122a to 122e. Accordingly, the FOV of the imaging device 100 may be controlled by adjusting the movement distance X of the movable column 132. That is, as the movement distance X increases, the angle of circumference Φ increases, resulting in an increase of the FOV of the imaging device 100.

Figure 2:
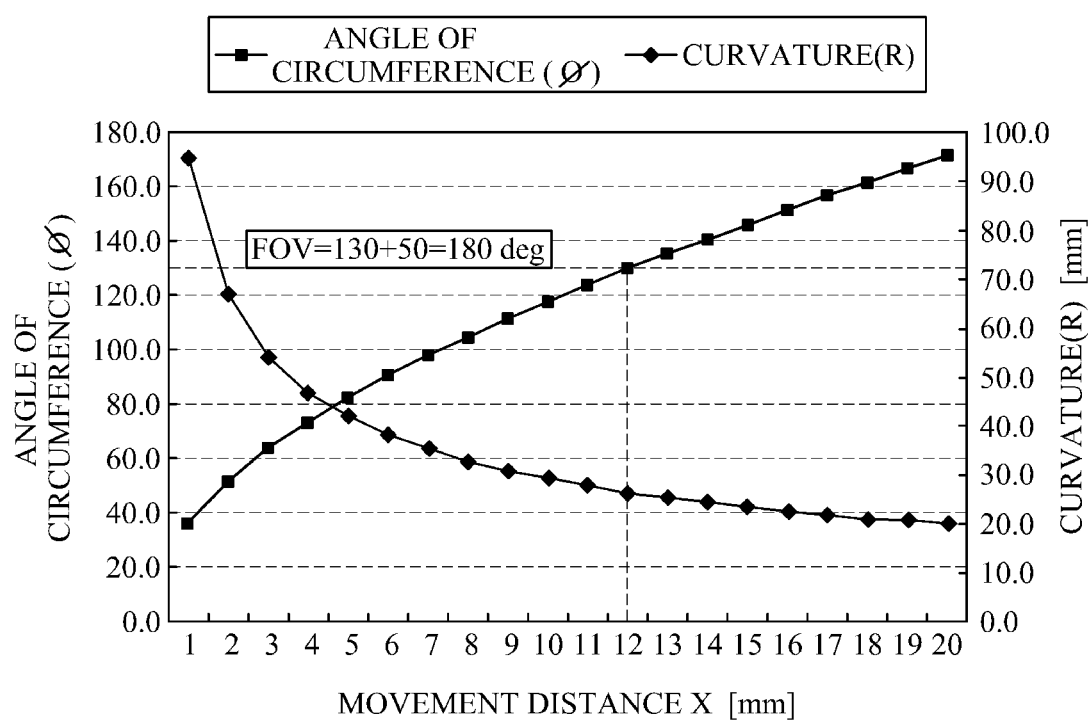
FIG. 2 is a graph plotting the relationship of the radius of curvature R and the angle at the circumference with respect to a movement distance X when L=60 millimeters (mm), according to an exemplary embodiment.

FIG. 2 is a graph plotting the relationship of the radius of curvature R and the angle at the circumference Φ with respect to a movement distance X when L=60 millimeters (mm) in the example of FIG. 1B. It is seen from FIG. 2 that as the movement distance X increases, the radius of curvature R decreases and the angle of circumference Φ of the imaging unit region increases. If the FOV of each of the imaging units 122a to 122e positioned at the edge portions of the flexible substrate 121 is 50 degrees, the angle of circumference Φ of the imaging unit region has to be 130 degrees in order to make the FOV of the imaging device 100 180 degrees. According to the graph illustrated in FIG. 2, it is seen that by moving the movable column 132 by about 12 mm, the angle of circumference Φ of the imaging unit region becomes 130 degrees.

Figure 3:
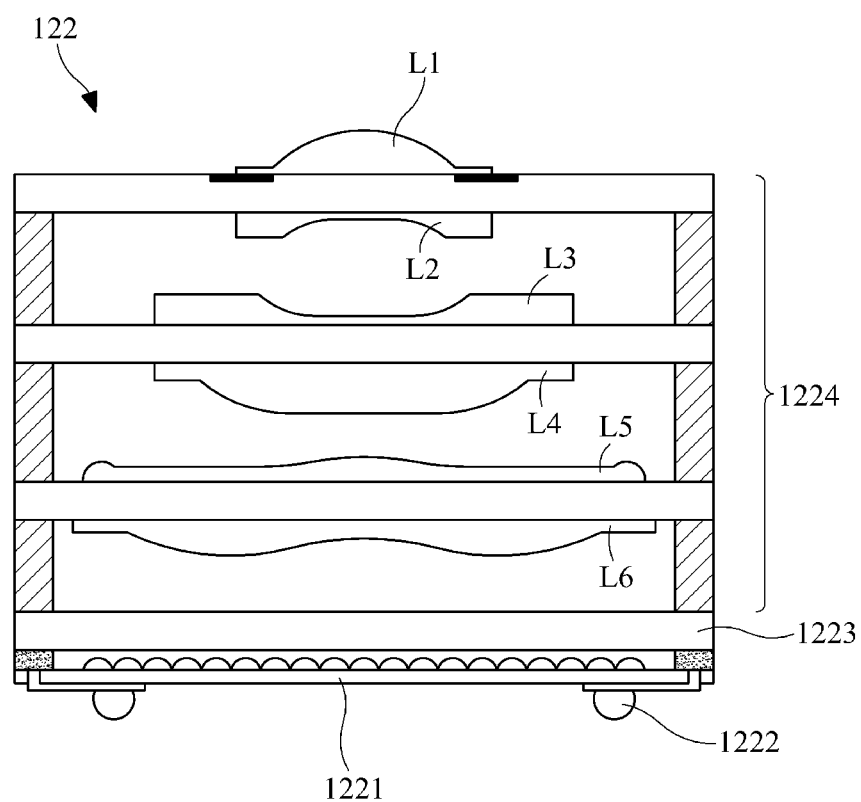
FIG. 3 is a sectional view illustrating an imaging unit, according to an exemplary embodiment.

As described above, the imaging units 122 may be arbitrary kinds of imaging devices. One exemplary embodiment of such an imaging unit 122 is illustrated in FIG. 3. FIG. 3 is a sectional view illustrating an exemplary embodiment of the imaging unit 122. Referring to FIG. 3, the imaging unit 122 includes an image sensor 1221 and a lens unit 1224.

The image sensor 1221 is an electronic device that receives light incident through the lens unit 1224 and converts the received light into an electrical signal. The image sensor 1221 may be a Complementary Metal-Oxide Semiconductor (CMOS) image sensor or a Charged Coupled Device (CCD) image sensor. Also, the image sensor 1221 may be a low resolution image sensor with a 1 megapixel or less resolution, or a high resolution image sensor with a 3 megapixel or more resolution. The imaging units 122 illustrated in FIG. 1A or 1B do not need to have the same resolution and may be a group of imaging units that are combined in various manners according to applications. For example, only an imaging unit 122c positioned in the center may have a relatively higher resolution than the other imaging units 122a, 122b, 122d and 122d. Or, as illustrated in an example of FIG. 10A or 11A, it is possible that imaging units 42 aligned in a width direction have the same or different resolutions and at least one imaging unit 43 spaced apart from the imaging units 42 has a relatively higher or lower resolution than the imaging units 42.

Below the image sensor 1221, a terminal for electrical connection to an external device is formed; for example a contact pad 1222. For example, image signals acquired by the image sensor 1221 may be transferred to an image signal processor, etc. via the contact pad 1222. In FIG. 3, a solder ball is illustrated as the contact pad 1222; however, the kind of the contact pad 1222 may depend on a method in which the imaging unit 122 is packaged in the flexible substrate 121. A cover glass 1223 is disposed over the image sensor 1221 in order to protect the image sensor 1221 and prevent the image sensor 1221 from being contaminated. Also, an optical coating layer, such as an optical low-pass filter, a chrominance filter, an Infra-Red (IR) filter, etc. may be disposed above and/or below the cover glass 1223, which is not shown in FIG. 3.

The lens unit 1224 is provided above the cover glass 1223, that is, in front of the image sensor 1221 on an optical path, to form light reflected from a subject as an image on a light-receiving area of the image sensor 1221. For this, the lens unit 1224 includes one or more lens elements L1 through L6; the kind, material, number, etc. of which may vary. FIG. 3 shows an exemplary embodiment where the lens unit 1224 includes 3 wafer-scale lenses spaced apart by spacers having a predetermined height. Each wafer-scale lens includes a transparent substrate and at least one lens element attached on one or both sides of the transparent substrate.

The imaging unit 122 may further include a fluidic lens, a mechanical shutter, etc., which are not illustrated in FIG. 3.

The fluidic lens is used to adjust a focus distance to provide the imaging unit 122 with a macro function, an auto-focusing function, a zoom function, etc. The mechanical shutter is used to adjust the amount of light incident to the lens unit 1224; for example, an opened range of the lens unit 1224, a time for which the lens unit is opened, etc.

Hereinafter, the structure of the imaging device 100 will be described with reference to FIGS. 1A and 1B. In the following description, the flexible substrate 121 is divided into a first region I and a second region II in a width direction, but the division between the first region I and second region II does not mean that the flexible substrate 121 is physically divided into two portions. The division between the first region I and second region II are intended to more clearly describe the technical features of the current example.

The first region I of the flexible substrate 121 includes the imaging unit region and is located above the supporting substrate 111. Meanwhile, the second portion II of the flexible substrate 121 may be located above the supporting substrate 111 (see FIG. 4) or bent to penetrate the supporting substrate 111 such that an end 121c is located below the supporting substrate 111 (see FIGS. 1A and 1B). In the latter case, a through slit 116 may be formed in the supporting substrate 111 through which the flexible substrate 121 can pass. When the supporting substrate 111 has a predetermined thickness, a part of the flexible substrate 121 passing through the through slit 116 may be positioned structurally in a substantially vertical direction. The fixing portion 121a of the flexible substrate 121 may be directly or indirectly fixed at the through slit 116 or on the supporting substrate 111 around the through slit 116. As such, when the flexible substrate 121 is positioned in a substantially vertical direction around the fixing portion 121a, applying a force to the flexible substrate 121 in a width direction by moving the edge portion 121b of the first region I toward the fixing portion 121a makes the imaging unit region bent to a more circular shape. This will be described in more detail below.

Figure 4:
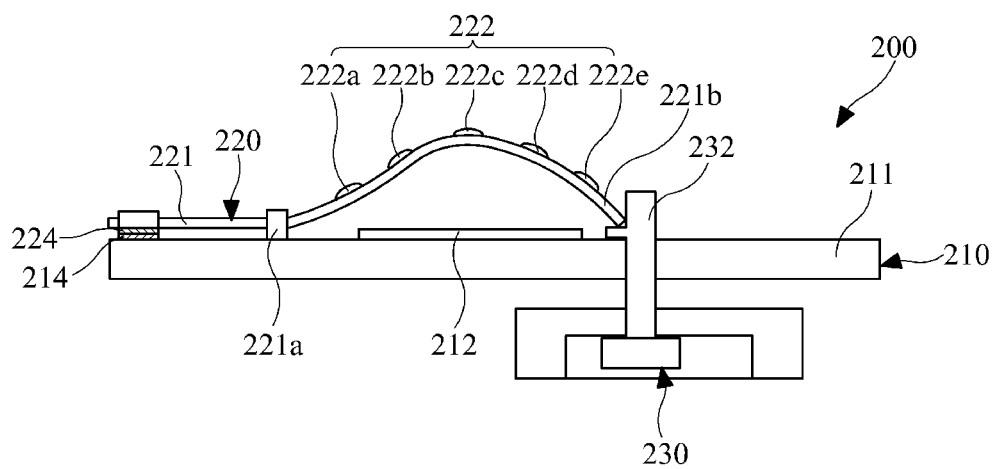
FIG. 4 is a sectional view illustrating another imaging device, according to an exemplary embodiment.

FIG. 4 is a sectional view illustrating another exemplary embodiment of an imaging device 200. Referring to FIG. 4, the imaging device 200 includes, like the imaging device 100 illustrated in FIG. 1B, a supporting substrate unit 210, a flexible substrate unit 220 and a movable unit 230. Also, a plurality of imaging units 222 are arranged in a width direction in an imaging unit region of the flexible substrate 221. However, unlike the imaging device 100 illustrated in FIG. 1B, the entire flexible substrate 221 is located above the supporting substrate 211. Also, the fixing portion 221a is affixed with the supporting substrate 211 without any mobility, and the opposite edge portion 221b of the fixing portion 221a is not coupled with the movable column 232. However, this structure is only exemplary.

As illustrated in FIG. 4, applying a force in a width direction to the flexible substrate 221 by moving the movable column 232 in the width direction makes the imaging unit region of the flexible substrate 221 bent and protruded. However, in this case, the bent shape may be not circular but rather asymmetrical, wherein the edge portion of the imaging unit region has a nearly infinite curvature such that the bent shape becomes a bell shape. As a result, images acquired by two imaging units 222a and 222b adjacent to the fixing portion 221a are the same or nearly same, so that the FOVs of the imaging units 222a and 222b overlap each other. Accordingly, it is difficult for the imaging device 200 illustrated in FIG. 4 to acquire a maximum FOV with the imaging units 222 installed in the flexible substrate 221.

There are several reasons why the imaging unit region of the flexible substrate 221 may be bent to be asymmetrical.

The first reason is because the flexible substrate 221 positioned above the supporting substrate 211 is fixed with the fixing portion 221 on the supporting substrate 211 in a width direction. Unlike the structure of FIG. 4, in the structure illustrated in FIGS. 1A and 1B, the flexible substrate 121 may be disposed to penetrate the through slit 116 of the supporting substrate 111 such that a part of the flexible substrate 121 passing through the through slit 116 is positioned in a substantially vertical direction. As a result, the imaging unit region of the imaging device 100 extends from the vertically disposed part of the flexible substrate 121 so that the imaging unit region is bent to be a more circular shape. If necessary, a roller bar having a predetermined curvature may be disposed on the supporting substrate near the through slit 116, and the flexible substrate 121 may be affixed at the roller bar, such that the part of the flexible substrate 121 passing through the through slit 116 (that is, the edge portion of the imaging unit region) may be easily bent to form the circular shape.

Another reason why the imaging unit region of the flexible substrate 221 illustrated in FIG. 4 is bent to be asymmetrical is because the fixing portion 221a of the flexible substrate 221 and the opposite edge portion 221b are fixed without mobility. The fixing portion 221a and the opposite edge portion 221b are fixed without mobility to prevent both edge portions of the imaging unit region from being bent to a circular shape. On the contrary, in the exemplary embodiments illustrated in FIGS. 1A, 1B and 1C, the fixing portion 121a and the opposite edge portion 121b of the flexible substrate 121 are fixed using connecting members 118 and 134 to permit mobility at least in an up-down direction, the imaging unit region may be bent to be a nearly circular shape. The circular shape results because the connecting members 118 and 134 are rotated at a predetermined angle in an up direction when a force is applied to the flexible substrate 121 in a width direction.

Also, when the connecting members 118 and 134 include fixing plates 118b having a predetermined width that are coupled with the connecting members 118 and 134 in such a manner as to have up-down directional mobility, and the fixing part 121a penetrating the through slit 116 has an inclination (that is, a predetermined magnitude of virtual component) corresponding to upward rotation of the fixing plate 118b. Accordingly, the imaging unit region of the flexible substrate 121 becomes a nearly circular shape.

Referring again to FIGS. 1A and 1B, the supporting substrate 111 may be a main printed circuit board (PCB) on which various circuits and electronic devices for driving the imaging device 100 are mounted and/or packaged. In this exemplary embodiment, various electrical devices required to operate the imaging device 100 may be mounted and/or packaged on one or both sides of the supporting substrate 111. These electrical devices may be electronic circuits, memories, etc., including an image signal processor (ISP) 112. Also, a conductor that is electrically connected with the image signal processor 112, etc. may be formed on the supporting substrate 111; for example, a contact member 114 such as an electrode pad. The contact member 114 formed on the supporting substrate 111 may be electrically connected with a contact member 124 formed on the flexible substrate 121 so that image signals generated by the imaging units 122 are transferred to the image signal processor 112 and processed.

In an exemplary embodiment where the flexible substrate is disposed above the supporting substrate 211, as illustrated in FIG. 4, two contact members 214 and 224 are connected above the supporting substrate 211. In this embodiment, since a connector (not shown) connecting the contact members 214 and 224 is positioned outside of the fixing portion 221a, electrical leads may be formed between the image signal processor 212 and the contact member 214; such as, for example, signal line paths formed on the upper surface of the supporting substrate 211.

Meanwhile, when the flexible substrate 121 is bent to penetrate the through slit 116, the contact members 114 and 124 may be connected below the supporting substrate 111. For example, as illustrated in FIGS. 1A and 1B, both edge portions 121b and 121c of the flexible substrate 121 are positioned on different sides of the supporting substrates with respect to the through slit 116, so that a connector (not shown) between the contact members 114 and 124 may be positioned at the opposite side of the through slit 116 from the image signal processor 112. In this exemplary embodiment, a signal line path that connects the image signal processor 112 with the contact member 114 may be formed by making a detour around the through slit 116.

Figure 5:
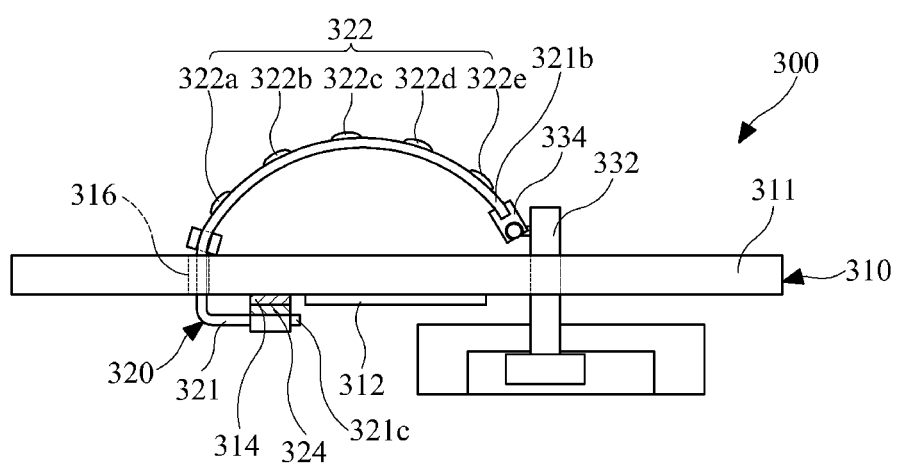
FIG. 5 is a sectional view illustrating another imaging device, according to an exemplary embodiment.

When a supporting substrate functions as a main PCB, an exemplary method of ensuring that a signal line path connects an image signal processor with a contact member when a through slot is formed in a supporting substrate is to bend a flexible substrate to a "⊏" shape, such that both edge portions of the flexible substrate are positioned on the same side with respect to the through slot. FIG. 5 is a sectional view illustrating an exemplary embodiment of an imaging device 300 having such a structure. Referring to FIG. 5, a flexible substrate 321 of the imaging device 300 is bent to penetrate a through slit 316, in such a manner that both edge portions of the flexible substrate 321 are positioned at the same side of a supporting substrate 311 with respect to the through slit 316. In this exemplary embodiment, two contact members 314 and 324 are connected below the supporting substrate 311, and a connector (not shown) between the contact members 314 and 324 is positioned on the same side of the supporting substrate 311 as an image signal processor 312 with respect to the through slit 316. Accordingly, a wire (not shown) that connects the image signal processor 312 with the contact member 314 does not need to pass across the through slit 316, which ensures a sufficient signal line path.

Figure 6:
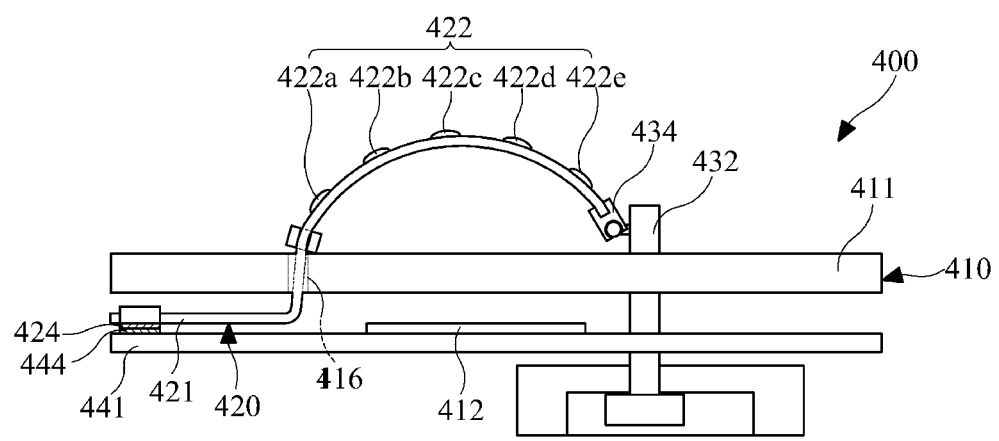
FIG. 6 is a sectional view illustrating another imaging device, according to an exemplary embodiment.

Another exemplary embodiment of a method of ensuring a sufficient signal line path when a through slit is formed in a supporting substrate is for a supporting substrate to perform only a function of supporting and affixing the flexible substrate. In this case, the imaging device further includes a third substrate, such as a main PCB, which includes an image signal processor, etc. disposed thereon. FIG. 6 is a sectional view illustrating an example of an imaging device 400 that includes a main PCB 441. Referring to FIG. 6, the imaging device 400 further includes a supporting substrate 411, a flexible substrate 420 and the third substrate, or main PCB 441 disposed below the supporting substrate 411. An image signal processor 412 and a contact member 444 electrically connected with the image signal processor 412 are packaged or formed on the main PCB 441. In this exemplary embodiment, a connector (not shown) that connects two contact pads 424 and 444 with each other is disposed on the main PCB 441, which lacks a through slit. Accordingly, a sufficient signal line path is ensured on the main PCB 441.

Referring to FIGS. 1A and 1B, the movable unit 130 is used to move the opposite edge portion 121b of the flexible substrate 121 with respect to the fixing portion 121a in a width direction. For example, the movable unit 130 bends the imaging unit region to a circular shape by moving the edge portion of the first region I of the flexible substrate 121, that is, the opposite edge portion 121b of the flexible substrate 121 with respect to the fixing portion 121a, toward the fixing portion 121a. The movable unit 130 may also flatten the circularshaped imaging unit region by moving the opposite edge portion 121b of the first region I of the flexible substrate 121 away from an end 121c. For this movement, the movable unit 130 may include a movable column 132 that is movable in a width direction, and a connecting member 134 that connects the edge portion 121b of the first portion I of the flexible substrate 121 with the movable column 132. Also, the movable unit 130 may further include a guiding member 136 (see FIG. 7A) for guiding the movable column 132 to move in a width direction, and a driving unit (not shown) for moving the movable column 132 in the width direction.

If the guiding member 136 is disposed below the supporting substrate 111, the movable column 132 may be positioned to penetrate the supporting substrate 111 or positioned to avoid coming in contact with the supporting substrate 111. In this exemplary embodiment, a guide channel (not shown) may be formed in the supporting substrate 111 through which the movable column 132 can move in a width direction. The guide channel is a passage formed in the supporting substrate 111 such that the movable column 132 penetrates the supporting substrate 111 and can move in the width direction. In the exemplary embodiment where the movable column 132 is positioned to avoid coming in contact with the supporting substrate 111, s guide channel need not be formed in the supporting substrate 111. In another exemplary embodiment, the guiding member 136 may be disposed above the supporting substrate 111. In this exemplary embodiment, the movable column 132 needs neither to penetrate the supporting substrate 111 nor be positioned to avoid contacting the supporting substrate 111.

The connecting member 134 connects the edge portion 121b of the first region I of the flexible substrate 121 with the movable column 132, thus transferring width-directional movement of the movable column 132 to the edge portion 121b of the first region I of the flexible substrate 121. As a result, when the movable column 132 moves toward the fixing portion 121a, the imaging unit region of the flexible substrate 121 is bent. At this time, if the connecting member 134 has up-down directional mobility, the imaging unit region can be bent to a more circular shape. For example, the connecting member 134 may include a universal joint.

The guiding member 136 guides the movable column 132 to move in the width direction and may be one of various kinds of guide devices. For example, the guiding member 136 may be a pair of linear motion (LM) guides (see 136 of FIGS. 7A and 7B) that are connected with the movable column 132. If the movable column 132 can perform width-directional movement without any guiding member, no guiding member may be included in the movable unit 130.

Figure 7A:
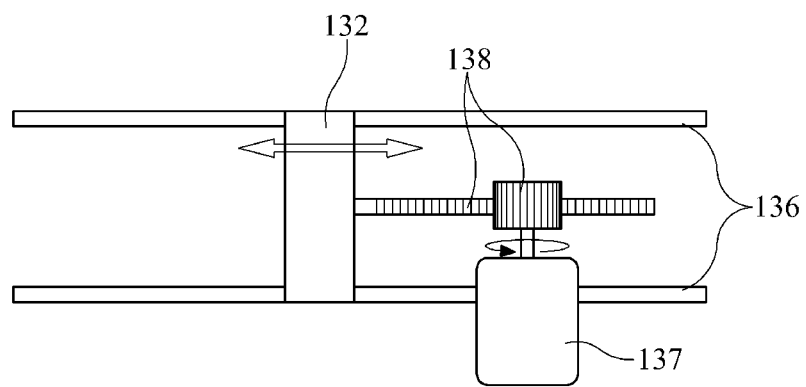
FIG. 7A is a view illustrating a motor driven type of driving unit, according to an exemplary embodiment.
Figure 7B:
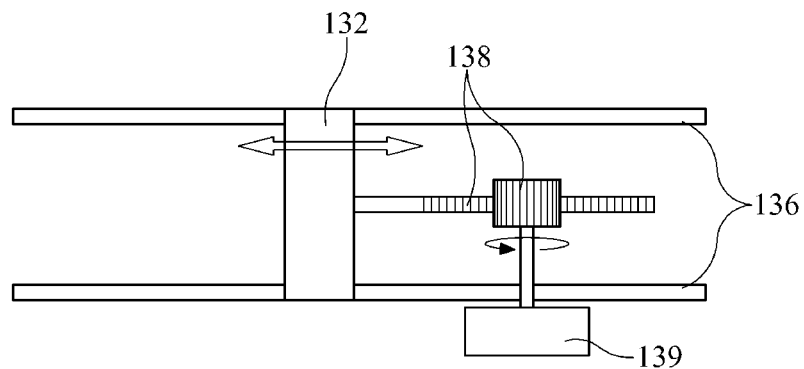
FIG. 7B is a view illustrating a manual driven type of driving unit, according to an exemplary embodiment.

A driving unit for driving the movable column 132 may be a motor-driven type or a manual-driven type. FIG. 7A is a view illustrating an exemplary embodiment of a motor-driven type of driving unit, and FIG. 7B is a view illustrating an example of a manual-driven type of driving unit. Referring to FIG. 7A, the driving unit may include a small motor 137, such as a step motor or a servo motor, and a power transfer unit 138 such as a rack and pinion to convert rotation movement of a motor (a rotation motor) into linear movement. If a linear motor for generating linear movement is used, no power transfer unit for converting rotation movement into linear movement is needed. The power transfer unit 138 converts rotation movement of the motor 137 into linear movement and transfer the linear movement to the movable column 132. The movable column 132 moves in the width direction along the guiding member 136.

In another exemplary embodiment where the driving unit is a manual-driven type, as illustrated in FIG. 7B, the power transfer unit 138 may be included in the driving unit, and may further include a manipulation unit 139 that is manually operated, instead of a motor. The manipulation unit 139 may be a bar type, a wheel type or a button type. The power transfer unit 138 converts movement of the manipulation unit 139 or rotation movement into linear movement and transfers it to the movable column 132. The movable column 132 moves in the width direction along the guiding member 136. The manipulation unit 139 may be exposed outside the housing of the imaging device 100.

Hereinafter, a pantoscopic camera including the imaging device with the plurality of imaging units as described above will be schematically described.

Figure 8A:
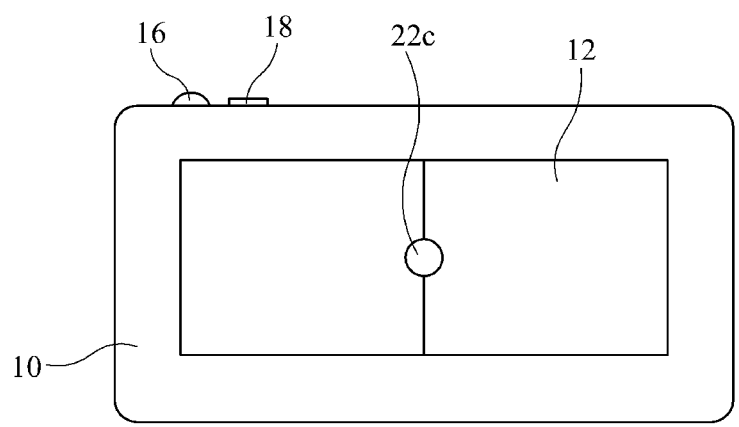
Figure 8B:
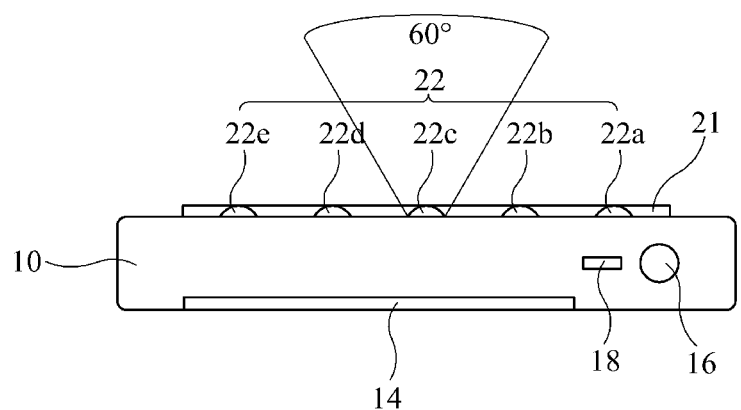
Figure 9A:
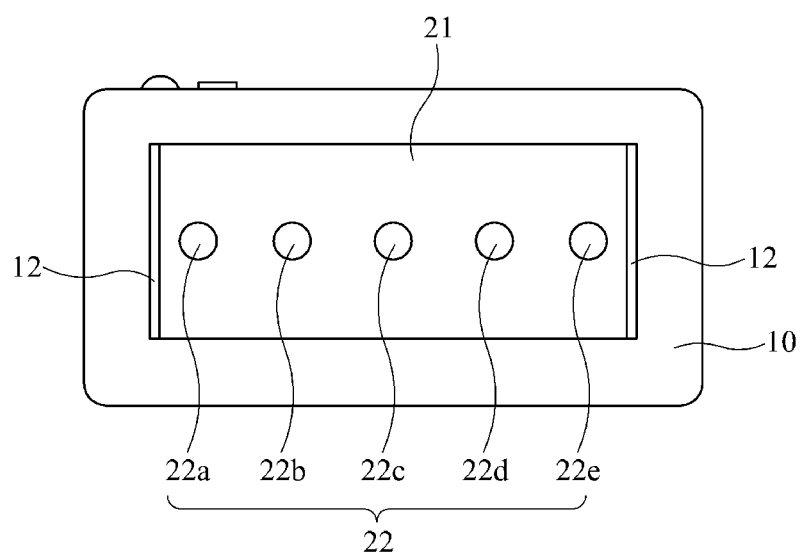
Figure 9B:
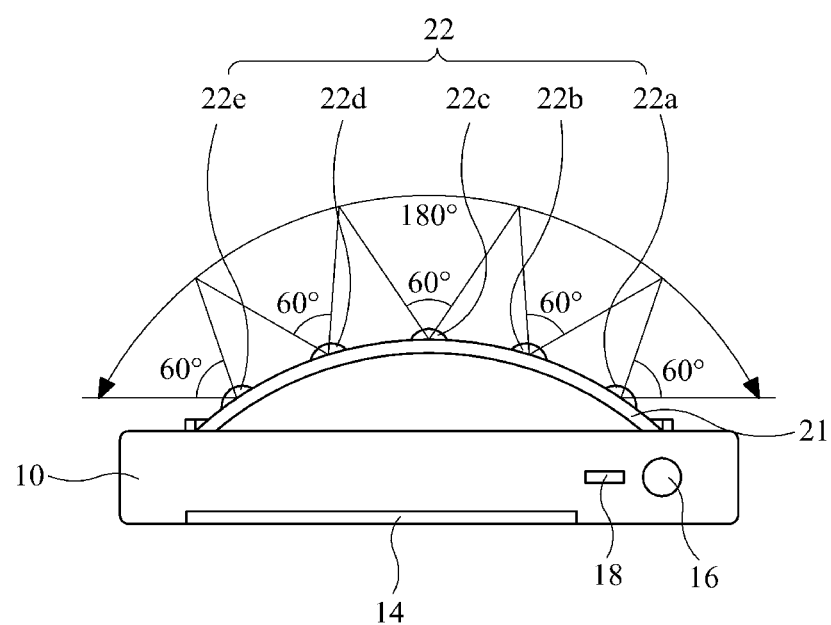

FIGS. 8A, 8B, 9A and 9B are front and side views illustrating an exemplary embodiment of a pantoscopic camera, wherein FIGS. 8A and 8B show a pantoscopic camera with a single imaging unit. FIGS. 9A and 9B show a pantoscopic camera with a plurality of imaging units. In FIGS. 8A, 8B, 9A and 9C, the entire structure of the imaging device with the plurality of imaging units is not definitely shown, but the imaging device is disposed in a housing 10, a portion of whose front side (not shown) is opened.

Referring to FIGS. 8A and 8B, in a configuration where photographing is performed with only one imaging unit, the flexible substrate 21 (and specifically the imaging unit region of the flexible substrate 21) is flattened. The pantoscopic camera may be also flattened when being carried or held. When the flexible substrate 21 is flattened, the thickness of the pantoscopic camera will be relatively thin. In the flattened state, a window 12 for multiple lens units mounted in the opened portion of the front side of the housing 10 is closed, but an imaging unit 22c of the imaging units 22 is exposed to the outside. Images taken at an FOV of 60 degrees are acquired through the exposed imaging unit 22c and may be displayed on a display 14 mounted in the housing 10. When a user presses a shutter button 16 while viewing an image displayed on the display 14, the pantoscopic camera photographs at a more widely-used FOV.

Referring to FIGS. 9A and 9B, in the configuration where photographing is performed using a plurality of imaging units, the flexible substrate 21 (more specifically the imaging unit region of the flexible substrate 21) is bent at a predetermined curvature. A degree at which the flexible substrate 21 is bent may be adjusted by a user, and this degree corresponds to a degree of FOV at which a plurality of imaging units photograph. For example, a user may drive a movable unit (not shown) of the imaging device using a button 18 for FOV adjustment to adjust a degree at which the flexible substrate 21 is bent, which correspondingly changes the degree of FOV at which the device photographs an image. At this time, the window 12 for multiple lens units is opened to expose all or part of the imaging units 22 to an outside of the housing 10, and the flexible substrate 21 is also bent to be exposed to the outside. Images, such as a panoramic image with 180 or more degrees of FOV, acquired through the exposed imaging units 22 may be displayed on the display 14 mounted on the housing 10. When the user presses the shutter button 16 while viewing an image displayed on the display 14, the pantoscopic camera performs photographing at a wide angle.

Figure 10A:
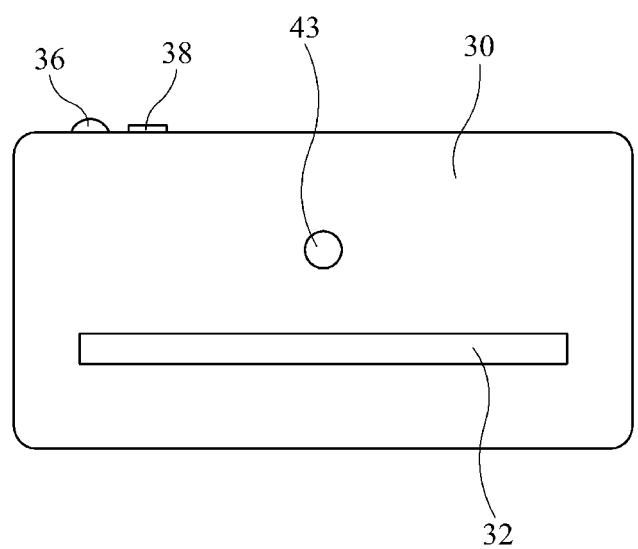
Figure 10B:
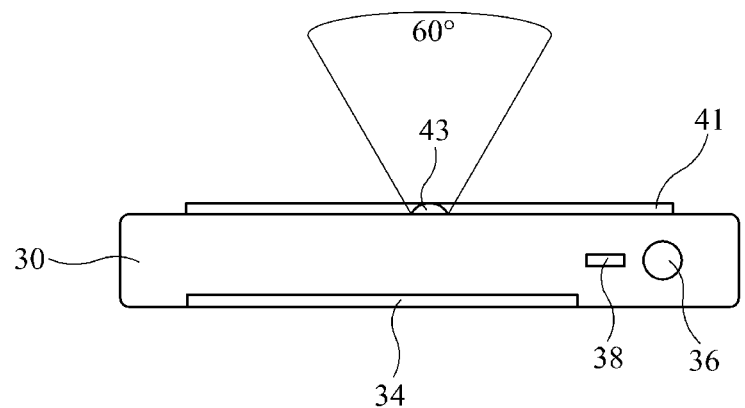
Figure 11A:
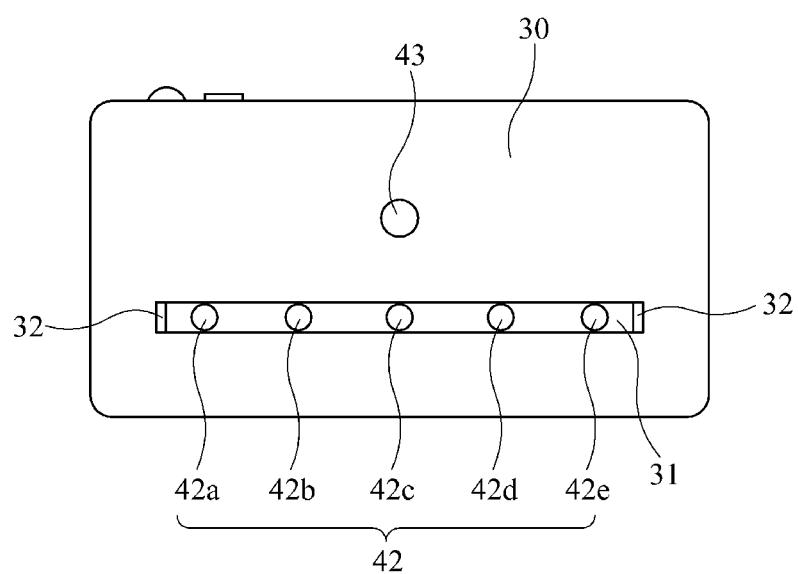
Figure 11B:
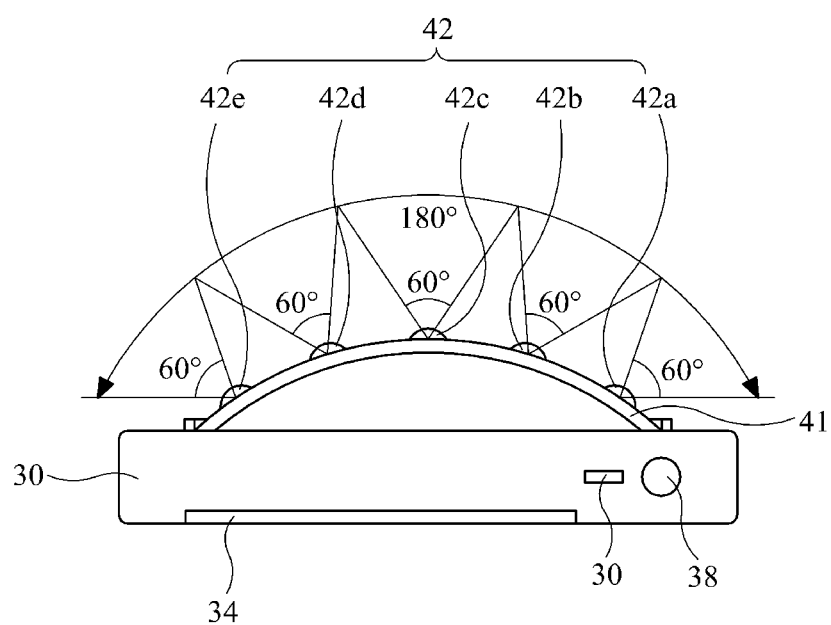

FIGS. 10A, 10B, 11A and 11B are front and side views illustrating another exemplary embodiment of a pantoscopic camera, wherein FIGS. 10A and 10B show a configuration for photographing an image with a single imaging unit, and FIGS. 11A and 11B show a configuration for photographing an image with a plurality of imaging units. An imaging device having the plurality of imaging units is installed in a housing 30 whose front side is opened, which is not illustrated in the drawings.

The pantoscopic camera illustrated in FIGS. 10A, 10B, 11A and 11B is different from the previously-described exemplary embodiment illustrated in FIGS. 8A, 8B, 9A and 9B in that the pantoscopic camera of FIGS. 10A, 10B, 11A and 11B further includes a separate imaging unit for normal photographing as well as a plurality of imaging units aligned in a width direction. That is, the pantoscopic camera illustrated in the example of FIGS. 8A, 8B, 9A and 9B, in which an imaging device includes only a plurality of imaging units aligned in a width direction, performs normal photographing using one of plurality of imaging units, whereas the pantoscopic camera illustrated in the exemplary embodiment of FIGS. 10A, 10B, 11A and 11B includes a plurality of imaging units 42 and a separate imaging unit 43 for normal photographing that is disposed at a different location from the imaging units 42. The imaging unit 43 for normal photographing may have different features from the imaging units 42, including a zoom function, an auto focusing function, resolution, etc.unitunit The imaging unit 43 may be a high performance imaging unit.

Referring to FIGS. 10A and 10B, in the configuration where photographing is performed with a single imaging unit, a flexible substrate 41 (specifically the imaging unit region of the flexible substrate 41) is flattened. When the pantoscopic camera is carried or held and is not being used, the thickness of the pantoscopic camera is relatively thin. A multiple lens unit window 32 mounted in the opened portion of the front side of the housing 30 is closed to cover all the imaging units aligned in the width direction. In contrast, the imaging unit 43 for normal photographing is not covered by the multiple lens unit window 32. Images acquired by the imaging unit 43 for photographing at 60 degrees of FOV may be displayed on a display 34 mounted on the housing 30. When a user presses a shutter button 36 while viewing an image displayed on the display 34, photographing of the image is performed through the imaging unit 43.

Referring to FIGS. 11A and 11B, in a configuration where photographing is performed using the plurality of imaging units 42, the flexible substrate 41 (specifically the imaging unit region of the flexible substrate 41) is bent at a predetermined curvature. A degree at which the flexible substrate 41 is bent can be adjusted by a user, and this degree corresponds to a degree of FOV at which the plurality of imaging units photograph. For example, a user may drive a movable unit (not shown) of the imaging device using a button 38 for FOV adjustment to adjust a degree at which the flexible substrate 41 is bent, which correspondingly changes the degree of FOV at which the device photographs an image. At this time, the multiple lens unit window 32 is opened to expose all or part of the imaging units 42 to an outside of the housing 30, and the flexible substrate 31 is also bent to be exposed to the outside. Meanwhile, the imaging unit 43 for normal photographing is controlled neither to be covered by any window nor to operate. Images such as a panoramic image with 180 or more degrees of FOV, acquired through the exposed imaging units 42 may be displayed on the display 34 mounted on the housing 30. When the user presses the shutter button 36 while viewing the image displayed on the display 14, photographing is performed at a wide angle through the imaging units 42.

Therefore, a FOV reaching approximately 150 degrees or more may be obtained from a plurality of imaging units mounted upon a flexible substrate by adjusting a degree at which the flexible substrate is bent. The wide FOV may be achieved without utilizing a special lens, such as a fisheye lens, and therefore no image distortion occurs upon wide-angle photographing. In addition, since the flexible substrate may be flattened upon normal photographing or upon being held when not being used, the imaging device may be manufactured to be compact and slim.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An imaging device comprising:
   a supporting substrate unit including a hard first substrate;
   a flexible substrate unit including a flexible second substrate and a plurality of imaging units that are arranged at least in a width direction on the second substrate, wherein the second substrate is fixed with the first substrate at a first edge portion of the second substrate; and
   a movable unit connected with an opposite second edge portion of the second substrate to move the opposite second edge portion of the plurality of imaging units in the width direction.

2. The imaging device of claim 1, wherein the second substrate is fixed with the first substrate by a first connecting member which is movable at least in an up direction and a down direction.

3. The imaging device of claim 2, wherein the first connecting member comprises a fixing member fixed with the first substrate and a pair of fixing plates coupled with the fixing member, the pair of fixing plates being movable at least in the up direction and a down direction, and
   wherein the second substrate is coupled with the pair of fixing plates in such a manner as to be inserted between the pair of fixing plates.

4. The imaging device of claim 1, wherein a through slit is formed in the first substrate, and wherein the second substrate is configured to penetrate the through slit.

5. The imaging device of claim 4, wherein the second substrate is configured such that both the first edge portion and opposite second edge portion of the second substrate extend in the same direction with respect to the through slit.

6. The imaging device of claim 4, wherein the second substrate is configured such that both the first edge portion and opposite second edge portion of the second substrate extend in opposite directions with respect to the through slit.

7. The imaging device of claim 4, further comprising a printed circuit board (PCB) including a third substrate, and an image signal processor disposed on the third substrate and electrically connected with the plurality of imaging units.

8. The imaging device of claim 1, wherein the movable unit comprises:
   a second connecting member coupled with the second substrate at the opposite second edge portion, the second connecting member being movable at least in an up direction and a down direction;
   a movable column coupled with the second connecting member and capable of moving in the width direction; and
   a driving unit connected with the movable column and capable of moving the movable column in the width direction.

9. The imaging device of claim 8, wherein the driving unit is motor-driven or manually-driven.

10. The imaging device of claim 1, wherein the supporting substrate unit further comprises an image signal processor disposed on the first substrate and electrically connected with the plurality of imaging units.

11. An imaging device comprising:
a hard first substrate;
a flexible second substrate divided into a first region and a second region, wherein the first region is located above the first substrate and includes a plurality of imaging units arranged at least in a width direction;
a connecting member connected with the second region, fixed with the first substrate and electrically connected with the plurality of imaging units; and
a movable unit connected with an edge portion of the first region and which moves the edge portion of the first region in the width direction.

12. The imaging device of claim 11, wherein the connecting member is movable at least in an up direction and a down direction above the first substrate.

13. The imaging device of claim 11, wherein a through slit is formed in the first substrate, and wherein the second substrate is configured such that the second region penetrates the through slit.

14. The imaging device of claim 13, wherein the connecting member is disposed below the first substrate, and wherein an image signal processor electrically connected with the connecting member is disposed on a lower surface of the first substrate.

15. The imaging device of claim 14, wherein the image signal processor is disposed on the first substrate at a location corresponding to the first region of the second substrate, and
wherein the second substrate is bent such that an edge portion of the first region and an edge portion of the second region extend in the same direction with respect to the through slit.

16. The imaging device of claim 12, further comprising a third substrate disposed below the first substrate, the third substrate including an image signal processor electrically connected with the connecting member,
wherein the connecting member is disposed below the first substrate.

17. The imaging device of claim 16, wherein the second substrate is configured such that both an edge portion of the first region and an edge portion of the second region extend in opposite directions with respect to the through slit.

18. The imaging device of claim 11, wherein the movable unit comprises:
a second connecting member coupled with the second substrate at the edge portion of the first region, the second connecting member being movable at least in an up direction and a down direction;
a movable column coupled with the second connecting member and capable of moving in the width direction; and
a driving unit connected with the movable column and capable of moving the movable column in the width direction.

19. The imaging device of claim 11, wherein each of the plurality of imaging units comprise:
a lens unit including at least one lens through which light reflected from a subject passes to form an image; and
an image sensor to receive the image formed by the lens unit and convert the image into an electronic signal.

20. The imaging device of claim 19, wherein the second substrate further comprises an imaging unit that includes an image sensor having a higher resolution than the image sensors of the plurality of imaging units.

21. An imaging device comprising:
a flexible substrate;
a plurality of imaging units arranged on the flexible substrate; and
a movable unit connected with the flexible substrate and configured to move the flexible substrate between a flat position and a curved position.

22. The imaging device of claim 21, wherein the flexible substrate is arranged on a front surface of the imaging device, and wherein the imaging units are arranged on the flexible substrate in a horizontal direction of the front surface of the imaging device.

23. The imaging device of claim 21, wherein the movable unit is connected with one end of the flexible substrate.

24. The imaging device of claim 21, wherein the flexible substrate is supported by a supporting substrate.

25. The imaging device of claim 21, wherein the movable unit moves the flexible substrate into a curved position to increase a field of view (FOV) of the plurality of imaging units.

26. The imaging device of claim 25, wherein the FOV of the plurality of imaging units is approximately at least 180 degrees when the flexible substrate is in the curved position.

* * * * *